US010216679B2

(12) United States Patent
Sato

(10) Patent No.: US 10,216,679 B2
(45) Date of Patent: Feb. 26, 2019

(54) SEMICONDUCTOR DEVICE AND CONTROL METHOD THEREOF

(71) Applicant: RENESAS ELECTRONICS CORPORATION, Tokyo (JP)

(72) Inventor: Makoto Sato, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 114 days.

(21) Appl. No.: 15/076,422

(22) Filed: Mar. 21, 2016

(65) Prior Publication Data

US 2016/0292120 A1  Oct. 6, 2016

(30) Foreign Application Priority Data

Mar. 30, 2015  (JP) ................................. 2015-067945

(51) Int. Cl.
*G06F 13/40*   (2006.01)
*G06F 9/30*    (2018.01)
(Continued)

(52) U.S. Cl.
CPC ........ *G06F 13/4068* (2013.01); *G06F 1/3293* (2013.01); *G06F 9/3012* (2013.01);
(Continued)

(58) Field of Classification Search
None
See application file for complete search history.

(56) References Cited

U.S. PATENT DOCUMENTS 5,835,925 A * 11/1998 Kessler ................. G06F 9/3004
                                                   711/2
8,418,187 B2    4/2013 Greenhalgh et al.
(Continued)

FOREIGN PATENT DOCUMENTS

JP    2009-505306 A    2/2009
JP    2013-521556 A    6/2013
(Continued)

OTHER PUBLICATIONS

Peter Greenhalgh, "Big.LITTLE Processing with ARM CortexTM-A15 & Cortex-A7," Sep. 2011.
(Continued)

*Primary Examiner* — Michael Sun
(74) *Attorney, Agent, or Firm* — McDermott Will & Emery LLP

(57) ABSTRACT

A migration of a program executing entity between a plurality of processors can be efficiently performed. A semiconductor device 1 includes a first processor 10, a second processor 20, and an external register 4 provided outside the processors. The first processor 10 includes a control circuit 12, an arithmetic circuit 14, and an internal storage circuit 16 provided inside the first processor 10. The second processor 20 includes a control circuit 22, an arithmetic circuit 24, and an internal storage circuit 26 provided inside the second processor 20. The control circuits 12 and 22 control execution of a program. The arithmetic circuits 14 and 24 perform an operation related to the program by using the external register 4. The external register 4 stores operation data related to the operation performed in the arithmetic circuits 14 and 24. The internal storage circuits 16 and 26 store execution state data regarding an execution state of the program.

13 Claims, 12 Drawing Sheets

(51) Int. Cl.
*G06F 9/54* (2006.01)
*G06F 9/38* (2018.01)

(52) U.S. Cl.
CPC ...... *G06F 9/30083* (2013.01); *G06F 9/30098* (2013.01); *G06F 9/3824* (2013.01); *G06F 9/543* (2013.01); *Y02D 10/14* (2018.01); *Y02D 10/151* (2018.01)

(56) References Cited

U.S. PATENT DOCUMENTS

| | | |
|---|---|---|
| 8,533,505 B2 | 9/2013 | Greenhalgh |
| 9,977,664 B2* | 5/2018 | Toyama ................. G06F 8/451 |
| 2007/0043965 A1 | 2/2007 | Mandelblat et al. |
| 2008/0120515 A1* | 5/2008 | Ritz ..................... G06F 9/5077 |
| | | 713/601 |
| 2009/0089787 A1* | 4/2009 | Giles ..................... G06F 9/5077 |
| | | 718/104 |
| 2011/0213993 A1* | 9/2011 | Greenhalgh .......... G06F 1/3203 |
| | | 713/320 |
| 2014/0115207 A1* | 4/2014 | Iyer ........................ G06F 13/42 |
| | | 710/105 |

FOREIGN PATENT DOCUMENTS

| | | |
|---|---|---|
| JP | 2013-521557 A | 6/2013 |
| JP | 2014-203185 A | 10/2014 |

OTHER PUBLICATIONS

Japanese Office Action issued in corresponding Japanese Patent Application No. 2015-067945, dated Jun. 26, 2018, with English Translation.

* cited by examiner

```
int a[21], x[20]
int i;

for (i=1; i<=20; i++) {
        x[i] = c0*a[i-1] + c1*a[i] + c2*a[i+1];
}
```

Fig. 4

SEMICONDUCTOR DEVICE AND CONTROL METHOD THEREOF

CROSS-REFERENCE TO RELATED APPLICATIONS

This application is based upon and claims the benefit of priority from Japanese patent application No. 2015-067945, filed on Mar. 30, 2015, the disclosure of which is incorporated herein in its entirety by reference.

BACKGROUND

The present invention relates to a semiconductor device and a control method thereof. For example, the present invention relates to a semiconductor device including a plurality of processors and a control method thereof.

There is an increasing tendency to provide a plurality of processors in one semiconductor device such as a microcomputer. As a related technique, Published Japanese Translations of PCT International Publication for patent applications, No. 2013-521556 and No. 2013-521557 disclose a data processing device including two processing circuits. In Published Japanese Translations of PCT International Publication for patent applications, No. 2013-521556 and No. 2013-521557, one of the processing circuits operates with higher performance than that of the other processing circuit. On the other hand, the energy efficiency of the processing circuit having the higher performance is lower than that of the other processing circuit having the lower performance. Further, In Published Japanese Translations of PCT International Publication for patent applications, No. 2013-521556 and No. 2013-521557, only one of the two processing circuits processes a work load. Then, when a transfer stimulus (or a migration stimulus) occurs during the execution of the work load by one of the processing circuits, the work load is transferred from the one processing circuit to the other processing circuit in order to improve the work efficiency or the power consumption efficiency. Further, a similar technique is also disclosed in Peter Greenhalgh, ARM, "Big.LITTLE Processing with ARM Cortex™-A15 & Cortex-A7", September 2011.

SUMMARY

The present inventors have found the following problem. In the aforementioned documents, when the work load (task) is transferred from one of the processing circuits to the other processing circuit, the state in the processing circuit executing the work load is transferred from that processing circuit to the other processing circuit. Specifically, the processing circuit executing the work load transfers all the data stored in a local storage device(s) possessed by that processing circuit to the other processing circuit.

Meanwhile, when the processing circuit includes a number of resources, the amount of data stored in the processing circuit increases. In such a case, when a work load is transferred from one of the processing circuits to the other processing circuit, the amount of transferred data is enormous. Therefore, the transfer of the data stored in the local storage device(s) of the processing circuit executing the work load to the other processing circuit requires a long time. Therefore, the transfer could affect the execution of the work load. Further, since a large amount of data is transferred, the power consumption could increase. That is, in the aforementioned documents, there is a possibility that when a work load is transferred from one of the processing circuits to the other processing circuit, the transfer could not be efficiently performed.

Other objects to be solved and novel features will be more apparent from the following description in the specification and the accompanying drawings.

A first aspect of the present invention is a semiconductor device including: a plurality of processors, each of the plurality of processors being configured to execute a program; and an external register disposed outside the processors, the external register being connected to each of the plurality of processors, in which each of the plurality of processors includes: a control circuit that controls execution of the program; an arithmetic circuit that performs an operation related to the program by using the external register; and at least one internal storage circuit, the at least one internal storage circuit being disposed inside of a respective one of the plurality of processors, the external register stores operation data related to the operation performed in the arithmetic circuit, and the internal storage circuit stores execution state data regarding a state of the execution of the program, the execution state data being data that is transferred from a transfer-origin processor to a transfer-destination processor when a program executing entity is changed from one of the plurality of processors to another of the plurality of processors halfway through the execution of the program.

Note that those that express the above-described apparatus according to the embodiment as a method or a system, programs that cause a computer to implement the aforementioned apparatus or a part of the above-described apparatus, image-pickup apparatuses including the aforementioned apparatus are also regarded as embodiments according to the present invention.

According to the above-described embodiment, the transfer (or the migration) of the program executing entity (i.e., the entity that executes a program) between a plurality of processors can be efficiently performed.

BRIEF DESCRIPTION OF THE DRAWINGS

The above and other aspects, advantages and features will be more apparent from the following description of certain embodiments taken in conjunction with the accompanying drawings, in which:

FIG. 4 shows a specific example of arithmetic processing according to the first embodiment;

DETAILED DESCRIPTION

Figure 1:
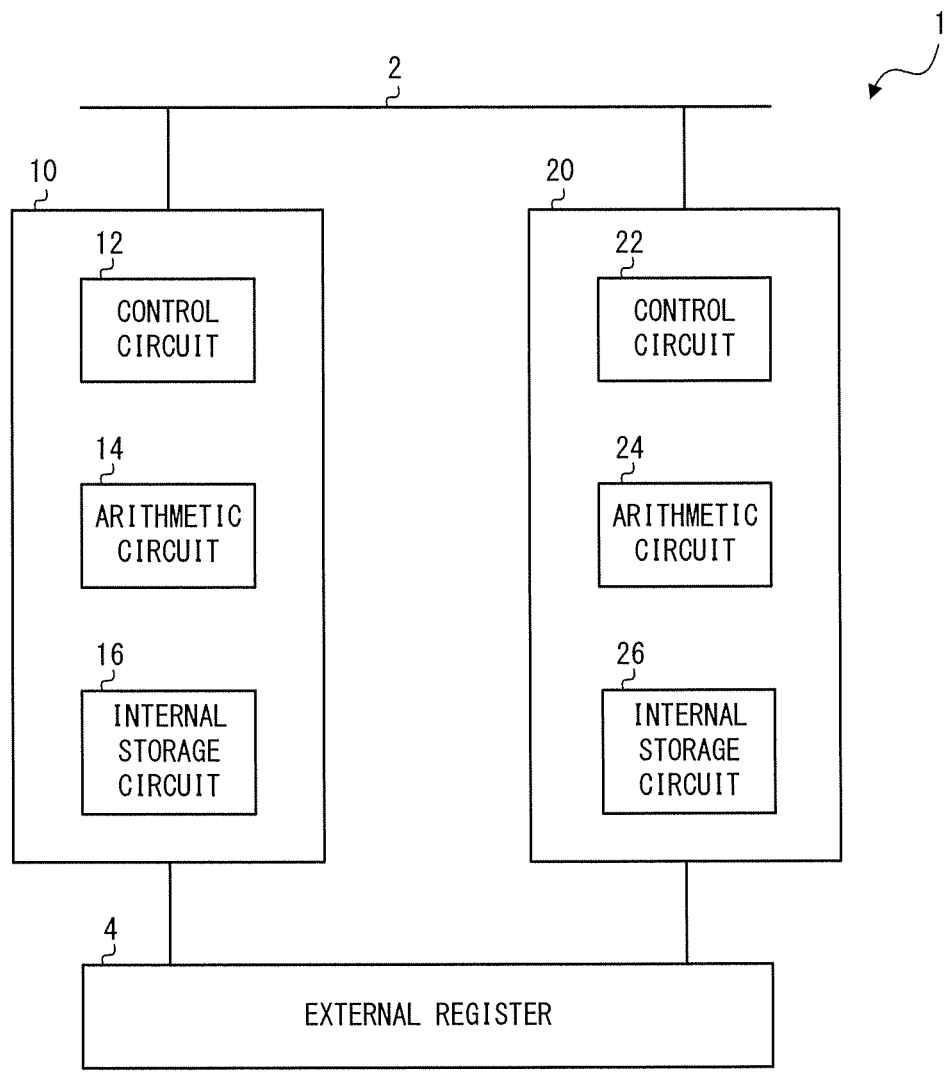
FIG. 1 shows an outline of a semiconductor device according to an embodiment.

Embodiments are hereinafter explained with reference to the drawings. For clarifying the explanation, the following descriptions and the drawings may be partially omitted and simplified as appropriate. Note that the same symbols are assigned to the same components throughout the drawings and duplicated explanations are omitted as required.

In the following embodiments, when necessary, the present invention is explained by using separate sections or separate embodiments. However, those embodiments are not unrelated with each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following embodiments, their components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

Further, each of the elements that are shown in the drawings as functional blocks for performing various processes can be implemented by hardware such as a CPU (Central Processing Unit), a memory, and other types of circuits, or implemented by software such as a program loaded in a memory. Therefore, those skilled in the art will understand that these functional blocks can be implemented solely by hardware, solely by software, or a combination thereof. That is, they are limited to neither hardware nor software.

Further, the above-described program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Outline of Embodiment

Prior to explanations of embodiments, an outline of an embodiment is explained.

FIG. 1 shows an outline of a semiconductor device 1 according to this embodiment. The semiconductor device 1 includes a plurality of processors, i.e., a first processor 10 and a second processor 20, and an external register 4. The first and second processors 10 and 20 are connected to each other through a bus 2. The external register 4 is disposed outside the first and second processors 10 and 20 and connected to each of the first and second processors 10 and 20. That is, the external register 4 is shared by the first and second processors 10 and 20.

Each of the first and second processors 10 and 20 executes a program. The first processor 10 includes a control circuit 12, an arithmetic circuit (or an operation circuit) 14, and an internal storage circuit 16 disposed inside the first processor 10. Similarly, the second processor 20 includes a control circuit 22, an arithmetic circuit (or operation circuit) 24, and an internal storage circuit 26 disposed inside the second processor 20. Each of the control circuits 12 and 22 controls the execution of a program. Each of the arithmetic circuits 14 and 24 performs an operation (or a calculation) related to the program by using the external register 4. Note that the internal storage circuit 16 may be disposed inside the control circuit 12. Similarly, the internal storage circuit 26 may be disposed inside the control circuit 22.

The external register 4 stores operation data related to operations (or calculations) performed in the arithmetic circuits 14 and 24. Meanwhile, each of the internal storage circuits 16 and 26 stores execution state data related to the execution state of the program. Note that the execution state data is transferred from a transfer-origin processor to a transfer-destination processor when the entity (i.e., the processor) that executes the program (hereinafter also referred to as a "program executing entity" or simply as a "executing entity") is changed from the first processor 10 (or the second processor 20) to the second processor 10 (or the first processor 10) halfway through the execution of the program.

In the semiconductor device 1 according to this embodiment, the external register 4, which is disposed outside the processors, stores operation data and the arithmetic circuits 14 and 24 perform operations (or calculations) by using this external register 4. Therefore, there is no need to transfer the operation data stored in the external register 4 when the program executing entity is changed from the first processor 10 (or second processor 20) to the second processor 20 (or first processor 10). Accordingly, the amount of data that is transferred when the program executing entity is changed from the first processor 10 (or second processor 20) to the second processor 20 (or first processor 10) is reduced. As a result, the migration (i.e., transfer) of the program executing entity between the first and second processors 10 and 20 can be efficiently performed in this embodiment.

First Embodiment

Figure 2:
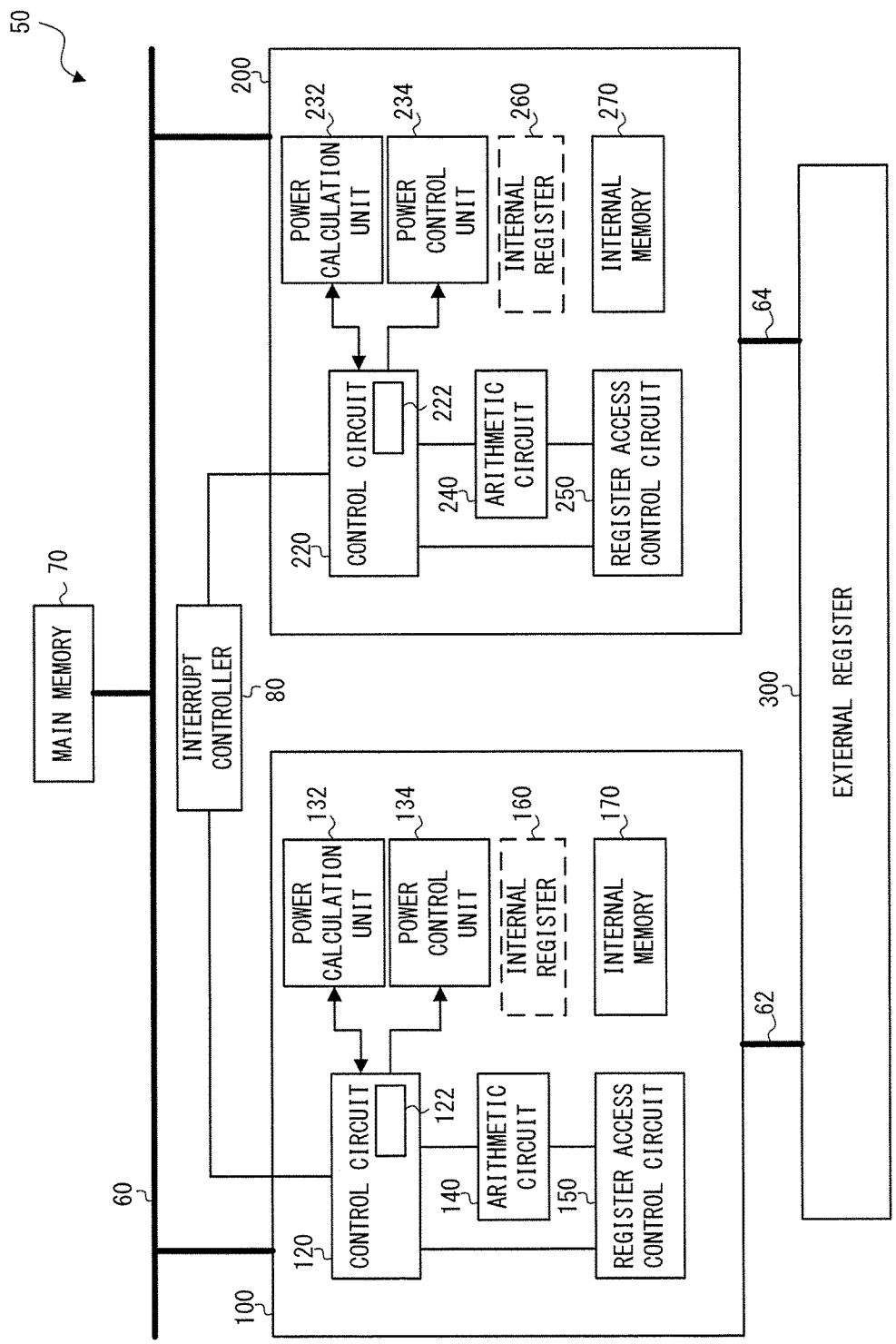
FIG. 2 shows a configuration of a semiconductor device according to a first embodiment.

FIG. 2 shows a configuration of a semiconductor device 50 according to a first embodiment. The semiconductor device 50 includes a main memory 70, an interrupt controller 80, a high-performance processor 100, a low-performance processor 200, and an external register 300.

The processing performance (e.g., the processing speed and the like) of the high-performance processor 100 is higher than that of the low-performance processor 200. In other words, the processing performance of the low-performance processor 200 is lower than that of the high-performance processor 100. Note that the "high-performance" means, for example, a high processing speed. More specifically, it means that the number of resources that can be simultaneously operated is large or a clock frequency is high.

Further, the power consumption of the low-performance processor 200 is preferably smaller than that of the high-performance processor 100. In other words, the power efficiency of the low-performance processor 200 is preferably higher than that of the high-performance processor 100. Further, the operation of the low-performance processor 200 is preferably stopped when the high-performance processor 100 is executing a program. On the other hand, the operation of the high-performance processor 100 is preferably stopped when the low-performance processor 200 is executing a program. That is, at a given time (except for during the later-described migration process), either one of the high-performance processor 100 and the low-performance processor 200 executes a program.

Note that the architecture of the high-performance processor 100 is identical to that of the low-performance processor 200. Therefore, either of the high-performance processor 100 and the low-performance processor 200 can execute the same program (the same instruction set) as that executed by the other processor. Further, in this embodiment, if the processing load state of the high-performance processor 100 decreases when the high-performance processor 100 is executing a program, the program executing entity is changed from the high-performance processor 100 to the low-performance processor 200, which has higher power efficiency. On the other hand, if the processing load state of the low-performance processor 200 increases when the low-performance processor 200 is executing a program, the program executing entity is changed from the low-performance processor 200 to the high-performance processor 100, which has higher performance.

The transfer in which the program executing entity is changed from the transfer-origin processor to the transfer-destination processor as described above is called a "migration". Note that the "executing entity" is a processor that is executing a program. Further, the "migration (i.e., transfer) of the program executing entity" means a change of the processor that is executing the program from one processor to another processor. For example, "the migration of the program executing entity from the high-performance processor 100 (first processor) to the low-performance processor 200 (second processor)" means a migration in which the low-performance processor 200 (second processor) takes over the execution of the program, which is originally executed by the high-performance processor 100 (first processor), halfway through the execution of the program. Further, for example, "the migration of the program executing entity from the low-performance processor 200 (first processor) to the high-performance processor 100 (second processor)" means a migration in which the high-performance processor 100 (second processor) takes over the execution of the program, which is originally executed by the low-performance processor 200 (first processor), halfway through the execution of the program. Further, an event that triggers a migration is called a "migration stimulus". In this embodiment, the migration stimulus for a migration from the high-performance processor 100 to the low-performance processor 200 is "a decrease in the processing load state (or a decrease in the power value resulting therefrom)". On the other hand, the migration stimulus for a migration from the low-performance processor 200 to the high-performance processor 100 is "an increase in the processing load state (or an increase in the power value resulting therefrom)". However, the migration stimulus is not limited to changes in the "processing load state".

The high-performance processor 100 includes a control circuit 120, a power calculation unit 132, a power control unit 134, an arithmetic circuit (or operation circuit) 140, a register access control circuit 150, an internal register 160, and an internal memory 170. Further, the control circuit 120 includes a general register 122. Note that the internal register 160, the internal memory 170, and the general register 122 are an internal storage circuit(s) disposed inside the high-performance processor 100.

Similarly, the low-performance processor 200 includes a control circuit 220, a power calculation unit 232, a power control unit 234, an arithmetic circuit (or operation circuit) 240, a register access control circuit 250, an internal register 260, and an internal memory 270. Further, the control circuit 220 includes a general register 222. Note that the internal register 260, the internal memory 270, and the general register 222 are an internal storage circuit(s) disposed inside the low-performance processor 200.

Note that the control circuit 220, the power calculation unit 232, the power control unit 234, the arithmetic circuit 240, the register access control circuit 250, the internal register 260, and the internal memory 270 correspond to the control circuit 120, the power calculation unit 132, the power control unit 134, the arithmetic circuit 140, the register access control circuit 150, the internal register 160, and the internal memory 170, respectively. Further, the general register 222 corresponds to the general register 122. Therefore, in the below explanation of the internal configuration of the low-performance processor 200, explanations for components that are identical to those for the high-performance processor 100 are omitted as appropriate.

The main memory 70 is connected to both the high-performance processor 100 and the low-performance processor 200 through a bus 60. The main memory 70 stores a program(s) that is executed by the high-performance processor 100 or the low-performance processor 200. Further, the main memory 70 can store a set of operation results (or calculation results) in the high-performance processor 100 or the low-performance processor 200.

An interrupt controller 80 performs control related to an interruption for the control circuit 120 or 220. Details of the interrupt control are described later. Further, the interrupt controller 80 may control (i.e., determine) which interruption should be prioritized when two or more interruptions occur at the same time.

The external register 300 is disposed outside of the high-performance processor 100 and the low-performance processor 200. The external register 300 is connected to the high-performance processor 100 through a bus 62. Further, the external register 300 is connected to the low-performance processor 200 through a bus 64. The external register 300 is used for arithmetic processing performed in the arithmetic circuits 140 and 240. The external register 300 is preferably a group of registers formed from a plurality of register circuits. Alternatively, the external register 300 may be one storage circuit including a plurality of storage areas.

The control circuit 120 is connected to the arithmetic circuit 140 inside the high-performance processor 100. The register access control circuit 150 is connected to the control circuit 120 and the arithmetic circuit 140 inside the high-performance processor 100. Similarly, the control circuit 220 is connected to the arithmetic circuit 240 inside the low-performance processor 200. The register access control circuit 250 is connected to the control circuit 220 and the arithmetic circuit 240 inside the low-performance processor 200. Further, the register access control circuits 150 and 250 are both connected to the external register 300. Further, the control circuits 120 and 220 are connected to each other through the bus 60 and the interrupt controller 80.

The internal register 160 is a register disposed inside the high-performance processor 100. Further, the internal memory 170 is a memory disposed inside the high-performance processor 100. Therefore, the internal register 160 and the internal memory 170 are internal storage circuits disposed inside the high-performance processor 100.

The internal register 160 may be disposed inside of each constituent resource of the high-performance processor 100 or disposed outside of each constituent resource. For example, the internal register 160 may be disposed inside the control circuit 120 or the register access control circuit 150. Note that, for example, the internal register 160 may be a control register such as a program counter. However, the internal register 160 is not limited to the control register. Further, the internal register 160 is preferably not disposed inside the arithmetic circuit 140. In this embodiment, the external register 300 acts as a register that should originally be disposed inside the arithmetic circuit 140. Note that the above explanations of the internal register 160 and the internal memory 170 are also applied to the internal register 260 and the internal memory 270, respectively.

The control circuit 120 is, for example, a CPU. The control circuit 120 controls the execution of a program stored in the main memory 70. Specifically, the control circuit 120 reads a program from the main memory 70 and performs control according to an instruction set of the program. Further, the control circuit 120 controls an operation(s) of a constituent resource(s) disposed inside the high-performance processor 100 when the control circuit 120 executes the program. Note that when the control circuit 120 controls the execution of a program, the control circuit 120 stores execution state data related to the execution state of the program into, for example, the general register 122. That is, the control circuit 120 controls the execution of a program by using execution state data stored in the internal storage circuit such as the general register 122.

Note that the "execution state" is, for example, information indicating the progress of the program (e.g., how far the program has been executed, which location of the program is executed and the like). However, the "execution state" is not limited to such information. Further, the execution state data can be stored in the internal register 160 or the internal memory 170. That is, the "execution state data" means all the data that can be stored in the internal storage circuit such as the general register 122, internal register 160, and internal memory 170. To put it differently, the "execution state data" is data other than the operation data (or the calculation data) stored in the external register 300 (which is described later).

Further, the control circuit 120 has a DVFS (Dynamic Voltage and Frequency Scaling) function. Note that this DVFS function is a function of dynamically changing the voltage and the frequency according to the load state of the processor. The control circuit 120 determines the load state in the execution of the program and determines the power state according to the load state. Note that the "power state" is information indicating the power state of all the resources disposed inside the processor (in the case of the control circuit 120, the high-performance processor 100). Examples of the power state include "to lower the frequency", "to stop supplying the clock", and "to cut off the power to the arithmetic circuit". The control circuit 120 outputs information indicating the frequency, the voltage, and the power state which the control circuit 120 is controlling.

Note that the above explanation of the control circuit 120 is also applied to the control circuit 220.

The power calculation unit 132 calculates (estimates) the power value of the high-performance processor 100 by using the information indicating the frequency, the voltage, and the power state output from the control circuit 120. Note that by the DVFS function, this power value increases as the load state becomes higher. Therefore, this power value can be regarded as information indicating the load state of the high-performance processor 100.

The power calculation unit 132 issues an interrupt to the control circuit 120 when the calculated power value remains equal to or lower than a threshold for a specified time period. Note that the "specified time" and the "threshold" are predetermined values. At this point, the control circuit 120 performs a process for transferring the program executing entity from the high-performance processor 100 to the low-performance processor 200. That is, the control circuit 120 performs a process for transferring the program executing entity to the low-performance processor 200 when the load state of the high-performance processor 100 decreases to or below the predetermined threshold (the value corresponding to the above-described threshold for the power value). Details of this migration process (i.e., the transfer process) are described later.

The power calculation unit 232 calculates (estimates) the power value of the low-performance processor 200 by using the information indicating the frequency, the voltage, and the power state output from the control circuit 220. Note that by the DVFS function, this power value increases as the load state becomes higher. Therefore, this power value can be regarded as information indicating the load state of the low-performance processor 200, as in the case of the high-performance processor 100.

The power calculation unit 232 issues an interrupt to the control circuit 220 when the calculated power value remains equal to or higher than a threshold for a specified time period. Note that the "specified time" and the "threshold" are predetermined values. It should be noted that the "specified time" and the "threshold" in the power calculation unit 232 (the low-performance processor 200) are not necessarily the same as those in the power calculation unit 132 (the high-performance processor 100). At this point, the control circuit 220 performs a process for transferring the program executing entity from the low-performance processor 200 to the high-performance processor 100. That is, the control circuit 220 performs a process for transferring the program executing entity to the high-performance processor 100 when the load state of the low-performance processor 200 increases to or above the predetermined threshold (the value corresponding to the above-described threshold for the power value). This migration process (i.e., the transfer process) is a process opposite to the aforementioned migration process for transferring the program executing entity from the high-performance processor 100 to the low-performance processor 200, and therefore the explanation of its details is omitted.

The power control unit 134 controls the internal power of the high-performance processor 100 under the control of the control circuit 120. Specifically, the power control unit 134 controls the internal power of the high-performance processor 100 according to the information indicating the frequency, the voltage, and the power state output from the control circuit 120.

Note that the above explanation of the power control unit 134 is also applied to the power control unit 234.

The arithmetic circuit 140 is a circuit for performing an operation (or calculation) related to the program controlled by the control circuit 120 under the control of the control circuit 120. Note that the arithmetic circuit 140 can perform arithmetic processing faster than the control circuit 120. For example, the arithmetic circuit 140 can perform parallel processing (vector operation) in an SIMD (Single Instruction Multiple Data) method. For example, the arithmetic circuit 140 can perform an operation (or calculation) for an enormous amount of data such as image processing and physical calculation.

It should be noted that in this embodiment, the arithmetic circuit 140 performs operations by using the external register 300. Specifically, when the arithmetic circuit 140 performs an operation, the arithmetic circuit 140 accesses the external register 300. Then, the arithmetic circuit 140 performs the operation by using data for the operation (operation data) stored in the external register 300. Then, the arithmetic circuit 140 stores an operation result (or a calculation result) in the external register 300. Specific examples of the operation performed in the arithmetic circuit 140 are described later.

Note that the above explanation of the arithmetic circuit 140 is also applied to the arithmetic circuit 240.

The register access control circuit 150 performs a process necessary for allowing the arithmetic circuit 140 to access the external register 300. For example, for the register access control circuit 150, an address in the external register 300 is designated by the control circuit 120. Then, the register access control circuit 150 performs control for allowing the arithmetic circuit 140 to access the designated address in the external register 300.

Note that the above explanation of the register access control circuit 150 is also applied to the register access control circuit 250.

Figure 3:
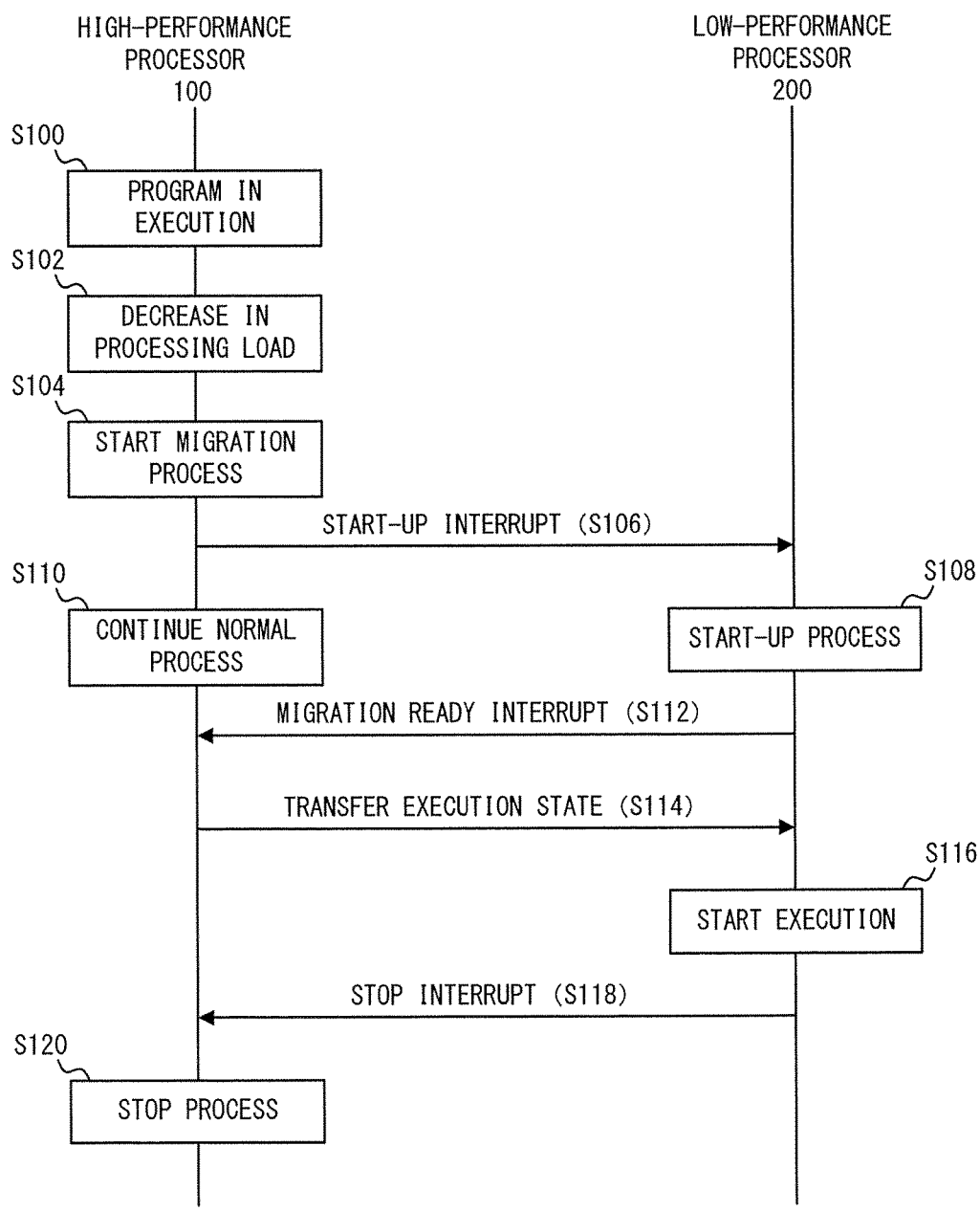
FIG. 3 is a sequence diagram showing a migration process procedure according to the first embodiment.

FIG. 3 is a sequence diagram showing a migration process procedure according to the first embodiment. FIG. 3 shows a control method for the semiconductor device 50 according to the first embodiment. FIG. 3 shows an example in which a program is originally executed in the high-performance processor 100 and then the program executing entity is changed from the high-performance processor 100 to the low-performance processor 200 during the execution of the program.

Firstly, the high-performance processor 100 is executing a program (S100). In this state, the control circuit 120 is controlling the execution of the program by using the general register 122 (or the internal register 160 and the internal memory 170) in the high-performance processor 100. That is, the control circuit 120 stores execution state data into the internal storage circuit such as the general register 122 and controls the execution of the program by using the execution state data stored in the internal storage circuit such as the general register 122. Meanwhile, the arithmetic circuit 140 is performing an operation related to the aforementioned program by using the external register 300. That is, the arithmetic circuit 140 performs the operation by using operation data stored in the external register 300 and stores an operation result into the external register 300. Note that the control circuit 120 may perform control so that a set of operation results stored in the external register 300 is transferred (or forwarded) to the main memory 70 as required.

Then, the processing load on the high-performance processor 100 decreases (S102). Specifically, the processing load of the program in the high-performance processor 100 decreases and hence by the DVFS function, the voltage and the frequency in the high-performance processor 100 decrease. As a result, the power value calculated by the power calculation unit 132 decreases to or below the threshold at this point. This means that a migration stimulus occurs at this point in the high-performance processor 100.

Then, the high-performance processor 100 starts a process for changing the program executing entity (S104). Specifically, as described above, when the power value calculated by the power calculation unit 132 remains equal to or lower than the threshold for the specified time period, the power calculation unit 132 issues an interrupt to the control circuit 120.

In response to the interrupt from the power calculation unit 132, the control circuit 120 issues a start-up interrupt to the low-performance processor 200 (S106). Specifically, upon receiving the interrupt from the power calculation unit 132, the control circuit 120 issues a start-up interrupt to the control circuit 220 through the interrupt controller 80. More specifically, the control circuit 120 outputs a start-up interrupt request to the interrupt controller 80. As a result, the interrupt controller 80 issues a start-up interrupt to the control circuit 220.

When the control circuit 220 of the low-performance processor 200 receives the start-up interrupt, the control circuit 220 performs a start-up process (Power-on & Reset) for starting up the low-performance processor 200 (S108). Examples of the start-up process include a process for invalidating data in a cache disposed inside the low-performance processor 200 and a process for enabling snooping. Meanwhile, the high-performance processor 100 continues the normal process until the high-performance processor 100 receives a migration ready interrupt (which is described later) from the low-performance processor 200 (S110).

After the start-up, the control circuit 220 issues a migration ready interrupt (Ready for Task Migration) to the high-performance processor 100 when the control circuit 220 becomes ready for undertaking the execution state from the control circuit 120 (S112). Specifically, the control circuit 220 issues the migration ready interrupt to the control circuit 120 through the interrupt controller 80 in a manner similar to that of the process in the step S106.

At this point, the high-performance processor 100 transfers the execution state to the low-performance processor 200 (S114). Specifically, upon receiving the migration ready interrupt, the control circuit 120 transfers execution state data stored in the internal storage circuit of the high-performance processor 100 to the low-performance processor 200 through the bus 60. More specifically, the control circuit 120 performs control so that the execution state data stored in the general register 122 is transferred to the general register 222. Further, the control circuit 120 performs control so that the execution state data stored in the internal register 160 and the internal memory 170 are transferred to the internal register 260 and the internal memory 270, respectively. In this way, the execution state in the high-performance processor 100 is transferred (i.e., migrated) to the low-performance processor 200.

It should be noted that in this embodiment, operation data related to an operation performed in the arithmetic circuit 140 is stored in the external register 300, which is shared by the high-performance processor 100 and the low-performance processor 200. Note that the external register 300 can also be accessed from the arithmetic circuit 240. In other words, the arithmetic circuit 240 can perform an operation by using the external register 300. Therefore, the operation data stored in the external register 300 is not transferred.

When the execution state is transferred (i.e., migrated), the low-performance processor 200 starts to execute the transferred program (S116). Specifically, the control circuit 220 restores the execution state by the transferred execution state data. As a result, the execution of the program can be started in the low-performance processor 200 after the migration (i.e., the transfer). At this point, the control circuit 220 can control the execution of the program by using the execution state data transferred from the high-performance processor 100, which is the transfer-origin processor. Meanwhile, after the migration, the arithmetic circuit 240 of the low-performance processor 200 can continue the operation, which was being executed before the migration, by using the operation data which has been stored in the external register 300 before the migration.

When the execution of the program is started in the low-performance processor 200, the low-performance processor 200 issues a stop interrupt to the high-performance processor 100 (S118). Specifically, at this point, the control circuit 220 issues the stop interrupt to the control circuit 120 through the interrupt controller 80 in a manner similar to that of the process in the step S112.

Upon receiving the stop interrupt, the high-performance processor 100 performs a stop process (S120). Specifically, upon receiving the stop interrupt, the control circuit 120 instructs the power control unit 134 to bring the high-performance processor 100 into a power cut-off state. Therefore, the power control unit 134 performs control so that the power to the high-performance processor 100 is cut off. Note that at this point, the high-performance processor 100 may perform a process for deleting data in the internal cache of the high-performance processor 100 and/or a process for disabling the snooping.

Note that the procedure for transferring (i.e., migrating) the program executing entity from the low-performance processor 200 to the high-performance processor 100 is substantially the same as the above-described procedure for transferring the program executing entity from the high-performance processor 100 to the low-performance processor 200 except that "the decrease in the processing load" in the step S102 is changed to "an increase in the processing load". Therefore, the explanation of the procedure for transferring the program executing entity from the low-performance processor 200 to the high-performance processor 100 is omitted.

Specific Examples of Arithmetic Processing

Figure 5:
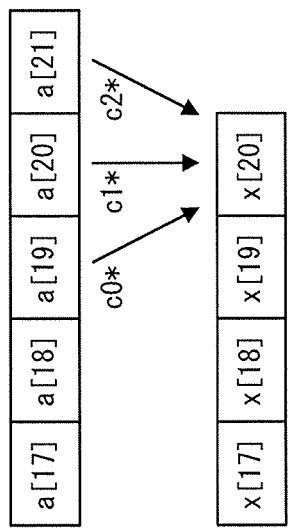
FIG. 5 shows a specific example of arithmetic processing according to the first embodiment.
Figure 5:
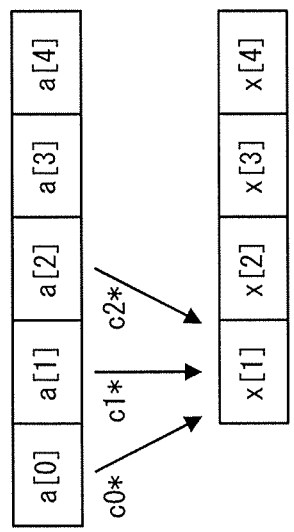

FIGS. 4 and 5 show a specific example of arithmetic processing according to the first embodiment. FIG. 4 shows an example of a filter program. Further, FIG. 5 is a diagram for explaining calculation performed in the filter program. Note that although an example in which arithmetic processing is performed in the high-performance processor 100 is explained hereinafter, the below explanation is similarly applied to the low-performance processor 200.

In the example arithmetic processing shown in FIGS. 4 and 5, values used for the calculation (hereinafter simply referred to as "values for the calculation") are input to an array a[0]-a[21] and values of an array x[1]-x[20] are calculated (i.e., obtained) as a calculation result. For example, in the case of image processing, values representing image data for which the image processing is performed are input to the array a[0]-a[21] and values of the array x[1]-x[20] which are values obtained by the image processing are calculated (i.e., obtained).

In the example arithmetic processing shown in FIGS. 4 and 5, the below-shown Expression 1 is calculated for each of i=1 to i=20.

$$x[i]=c0*a[i-1]+c1*a[i]+c2*a[i+1] \quad \text{[Expression 1]}$$

In the expression, c0, c1 and c2 are constants. In this way, the values of the array x[1]-x[20] are calculated.

For example, for i=0, the arithmetic circuit 140 multiplies the array elements a[0], a[1] and a[2] by c0, c1 and c2, respectively, and calculates the sum of these multiplication results. In this way, the arithmetic circuit 140 calculates the value of x[1]. The arithmetic circuit 140 repeatedly performs the above-described calculation until i becomes 20 (i.e., i=20) and thereby calculates the values of the array x[1]-x[20]. Note that the arithmetic circuit 140 can perform a vector operation in the SIMD method. Therefore, the arithmetic circuit 140 can simultaneously perform the above-described calculation for i=1 to i=10, for example, at a time and then simultaneously perform the calculation for i=11 to i=20 at a time.

Figure 6:
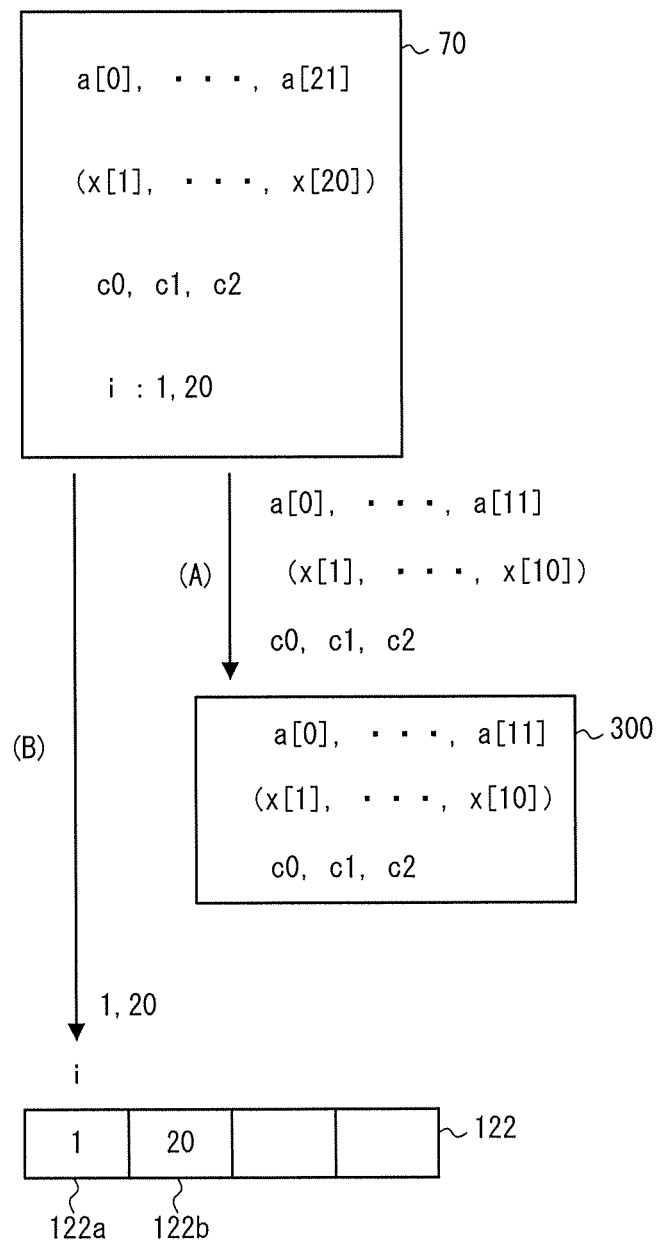
FIG. 6 shows an example of a data transfer in the arithmetic processing shown in FIGS. 4 and 5.

FIGS. 6 to 9 show examples of data movements in the example arithmetic processing shown in FIGS. 4 and 5. Firstly, as shown in FIG. 6, an array a[0]-a[21], an array x[1]-x[20], and constants c0, c1 and c2 are stored in the main memory 70. Further, an index initial value i=1 and the number of elements of the array x[i], i.e., the number i=20 are also stored in the main memory 70. Note that data used for the calculation (e.g., image data for which image processing is performed) are already input in the array a[0]-a[21]. Meanwhile, since the array x[1]-x[20] are an array to which a calculation result is input, no values have been input to the array x[1]-x[20] yet in the initial state. Note that in FIGS. 6 to 9, when no values have been input to, for example, the array x[i] yet, it is expressed as "(x[i])".

When the program shown in FIG. 4 is executed, the control circuit 120 first performs control so that calculation for i=1 to i=10 is performed as shown in FIG. 6. At this point, as indicated by an arrow (A) in FIG. 6, the control circuit 120 stores the array elements a[0]-a[11], in which the data used for the calculation (hereinafter simply referred to as "data for the calculation") have been already input, the array elements x[1]-x[10], and the constants c0, c1 and c2, all of which have been stored in the main memory 70, into the external register 300. Further, as indicated by an arrow (B), the control circuit 120 stores the index initial value i=1 and the number of elements of the array x[i], i.e., the number i=20 (hereinafter also expressed as "element number i=20") into the general register 122. As a result, the initial value "1" is stored in an area 122a of the general register 122 and the element number "20" is stored in an area 122b of the general register 122. Then, the arithmetic circuit 140 performs the calculation of Expression 1 for i=1 to i=10 by using the data stored in the external register 300. In this way, the arithmetic circuit 140 calculates the values of the array elements x[1]-x[10].

Figure 7:
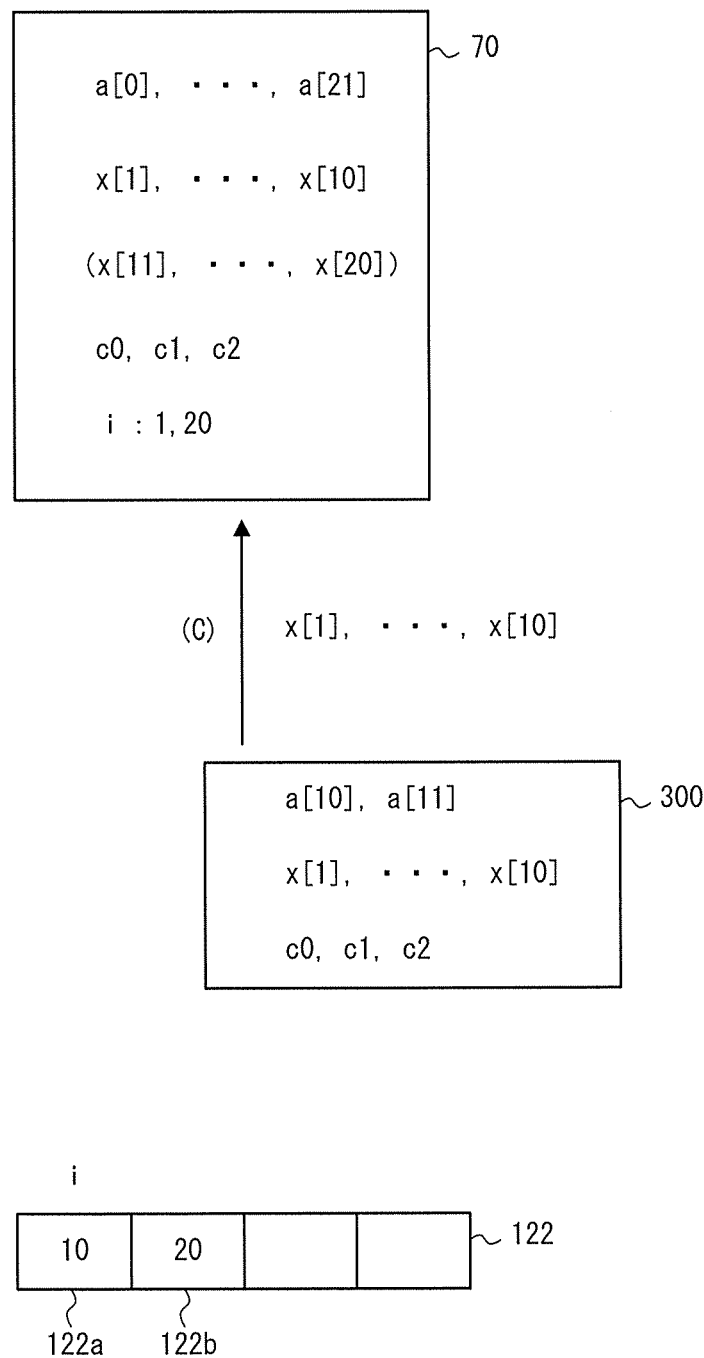
FIG. 7 shows an example of a data transfer in the arithmetic processing shown in FIGS. 4 and 5.

As shown in FIG. 7, the values of the array elements x[1]-x[10] calculated by the arithmetic circuit 140 are stored in an area corresponding to the array elements x[1]-x[10] in the external register 300. At this point, the control circuit 120 inputs a value "10", which indicates that the calculation has been completed up to i=10, into the area 122a of the general register 122. Further, as shown in an arrow (C), the control circuit 120 stores the values of the array elements x[1]-x[10] into the main memory 70. Note that values of the array elements a[10] and a[11] have been stored in the external register 300 because they are used for the calculation for i=11 and so on. In contrast to this, the values for the array elements a[0]-x[9] and the array elements x[1]-x[10] may be deleted (or rewritten) for the subsequent array elements.

Figure 8:
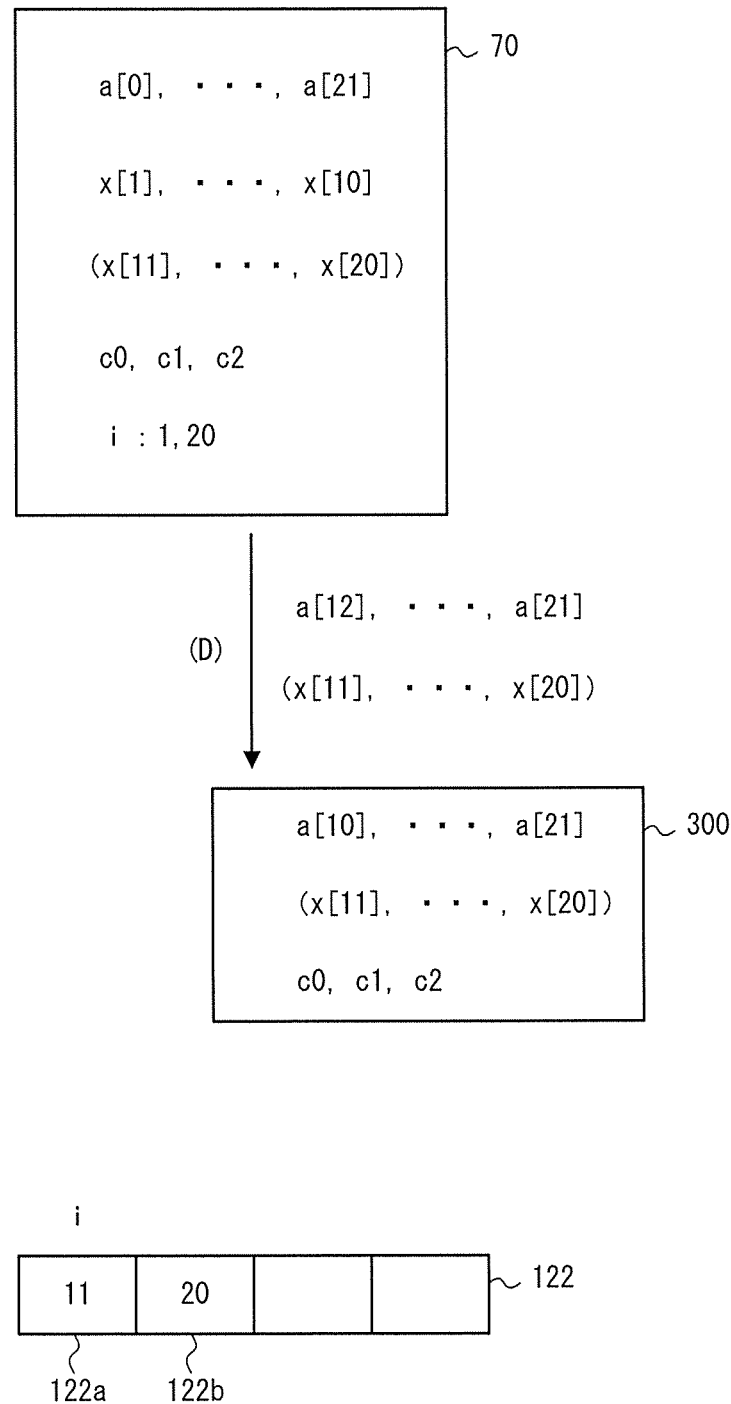
FIG. 8 shows an example of a data transfer in the arithmetic processing shown in FIGS. 4 and 5.

Next, as shown in FIG. 8, the control circuit 120 performs control so that calculation for i=11 to i=20 is performed. At this point, the control circuit 120 inputs a value "11", which indicates that the calculation is performed from i=11, into the area 122a of the general register 122. Further, as shown in an arrow (D) in FIG. 8, the control circuit 120 stores the array elements a[12]-a[21], in which the data for the calculation have been input, and the array elements x[11]-x[20], both of which have been stored in the main memory 70, into the external register 300. Then, the arithmetic circuit 140 performs the calculation of Expression 1 for i=11 to i=20 by using the data stored in the external register 300. In this way, the arithmetic circuit 140 calculates the values of the array elements x[11]-x[20].

Figure 9:
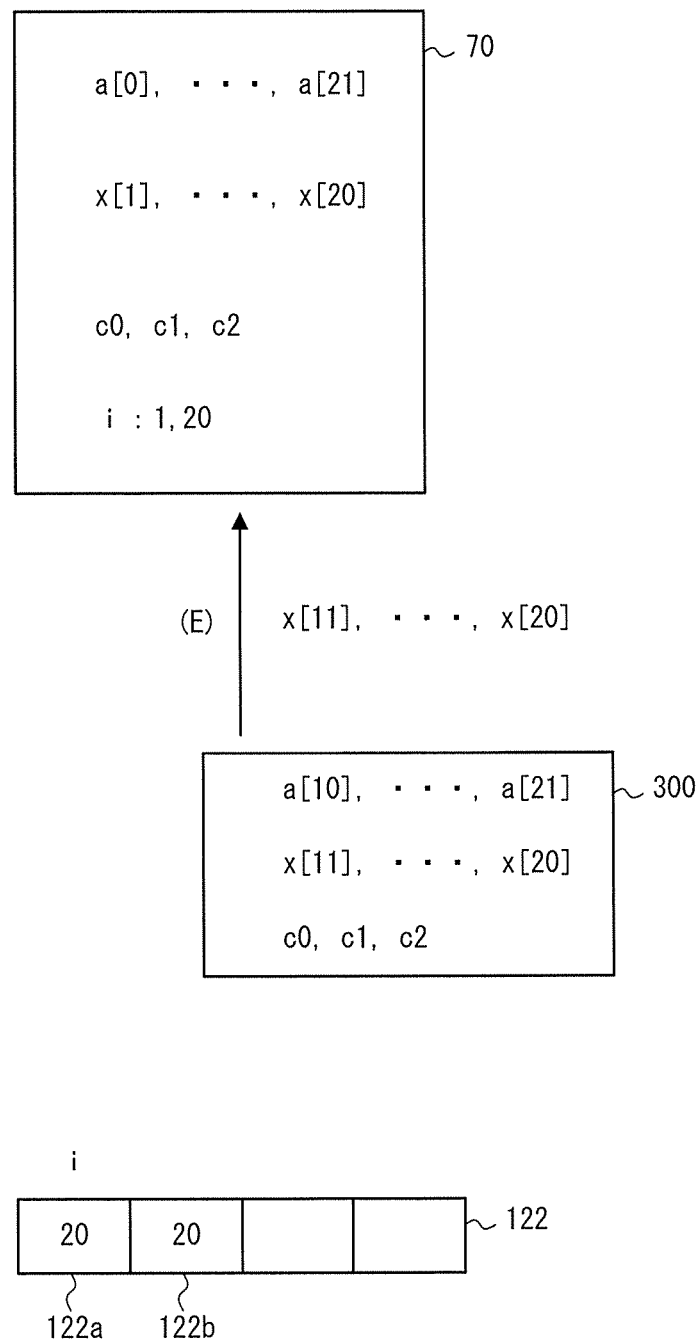
FIG. 9 shows an example of a data transfer in the arithmetic processing shown in FIGS. 4 and 5.

As shown in FIG. 9, the values of the array elements x[11]-x[20] calculated by the arithmetic circuit 140 are stored in an area corresponding to the array elements x[11]-x[20] in the external register 300. At this point, the control circuit 120 inputs a value "20", which indicates that the calculation has been completed up to i=20, into the area 122a of the general register 122. Further, as shown in an arrow (E), the control circuit 120 stores the values of the array elements x[11]-x[20] into the main memory 70. Since the value of the area 122a becomes equal to the value of the area 122b at this point, the control circuit 120 performs control so that the arithmetic processing is finished. In this case, the control circuit 120 may delete the array elements a[10]-a[21] and the array elements x[11]-x[20] stored in the external register 300.

Note that if the program executing entity is changed from the high-performance processor 100 to the low-performance processor 200 in the state shown in FIG. 7, the data stored in the general register 122 (the value "10" stored in the area 122a and the value "20" stored in the area 122b) are transferred to the low-performance processor 200 as described above. In contrast to this, the operation data (or calculation data) stored in the external register 300 is not transferred. Then, the arithmetic circuit 240 of the low-performance processor 200 performs the operation (or the calculation) from i=11 by using the data stored in the external register 300 (shown in FIG. 7).

In the case in which a semiconductor device including a plurality of processors is configured so that each processor includes its respective register(s) in which operation data used by an arithmetic circuit of that processor is stored, when the program executing entity is changed from one processor to another processor, the operation data as well as the execution state data needs to be transferred from the transfer-origin processor to the transfer-destination processor. In such a case, in particular, if the amount of the operation data is large, the amount of the transferred data increases.

In contrast to this, in the semiconductor device 50 according to this embodiment, the external register 300, which is disposed outside the high-performance processor 100 and the low-performance processor 200, stores the operation data and the arithmetic circuits 140 and 240 performs the operation (or the calculation) by using the external register 300. Therefore, there is no need to transfer the operation data stored in the external register 300 when the program executing entity is changed from the high-performance processor 100 to the low-performance processor 200. Accordingly, the amount of data that is transferred when the program executing entity is changed between the high-performance processor 100 and the low-performance processor 200 is reduced. Consequently, the time necessary for the migration (i.e., the transfer) of the program executing entity is reduced. Further, since the amount of the transferred data is reduced, the amount of power consumed for the migration in the semiconductor device 50 can be reduced. That is, the migration of the program executing entity between the high-performance processor 100 and the low-performance processor 200 can be efficiently performed in this embodiment.

Meanwhile, in this embodiment, the control circuit 120 controls the execution of a program by using execution state data stored in the internal storage circuit (such as the general register 122) disposed inside the high-performance processor 100. In other words, the execution state data is not stored in the externally-disposed storage circuit. With the above-described configuration, the control circuit 120 just needs to access the internal storage circuit of the high-performance processor 100 when the control circuit 120 executes a program. Therefore, the control circuit 120 can increase the processing speed when the control circuit 120 executes the program compared to the case where the execution state data is stored in the external storage circuit. Note the above explanation is also applied to the control circuit 220.

Further, in this embodiment, after the program executing entity is changed, for example, from the high-performance processor 100 to the low-performance processor 200, the control circuit 220 controls the execution of the program by using the execution state data transferred from the high-performance processor 100. Meanwhile, after the migration, the arithmetic circuit 240 performs the operation, which was being executed before the migration, by using the operation data which has been stored in the external register 300 before the migration. Note that in general, as shown as examples in FIGS. 6 to 9, the amount of the execution state data is smaller than the amount of the operation data. Therefore, even when the execution state data is transferred when the program executing entity is changed, it does not take a long time. In contrast to this, in particular, when the arithmetic circuit performs a vector operation in the SIMD method, the amount of the operation data is enormous. With the above-described configuration, the operation can be continued in the arithmetic circuit 240 of the transfer-destination processor (low-performance processor 200) without transferring such enormous operation data at the time of the migration in this embodiment.

Further, in this embodiment, the external register 300 is a group of registers formed from a plurality of register circuits, or one storage circuit including a group registers including a plurality of storage areas. In this way, when the operation performed in the arithmetic circuit is a vector operation, values of a plurality of arrays (or a plurality of array elements) can be stored at a time. Further, since the operation data stored in the external register 300 is not transferred when the executing entity is changed, there is no need to transfer the enormous operation data (values of arrays) stored in the above-described group of registers at the time of the migration of the executing entity.

Further, the semiconductor device 50 according to this embodiment includes the high-performance processor 100, which is a high-performance processor, and the low-performance processor 200, which is a low-performance processor. Further, the power efficiency of the low-performance processor 200 is higher than that of the high-performance processor 100. Therefore, the semiconductor device 50 according to this embodiment can also be applied to a system in which a high-performance processor 100 is combined with a low-performance processor 200 so that the power is reduced when the load is low and the system exhibits high performance when the load is high. Further, in this embodiment, the migration of the program executing entity can be efficiently performed even in such a system.

Further, in this embodiment, the external register 300, which is different from the main memory 70, is provided. Therefore, the external register 300, which is different from the main memory 70, can be shared by the high-performance processor 100 and the low-performance processor 200 in this embodiment. Further, while the main memory 70 is connected to the high-performance processor 100 and the low-performance processor 200 through the common bus, the external register 300 is connected to the high-performance processor 100 and the low-performance processor 200 through mutually-different buses 62 and 64. Therefore, the speed of the access to the external register 300 can be increased compared to the case where the operation data is stored into the main memory 70.

Second Embodiment

Next, a second embodiment is explained.

Figure 10:
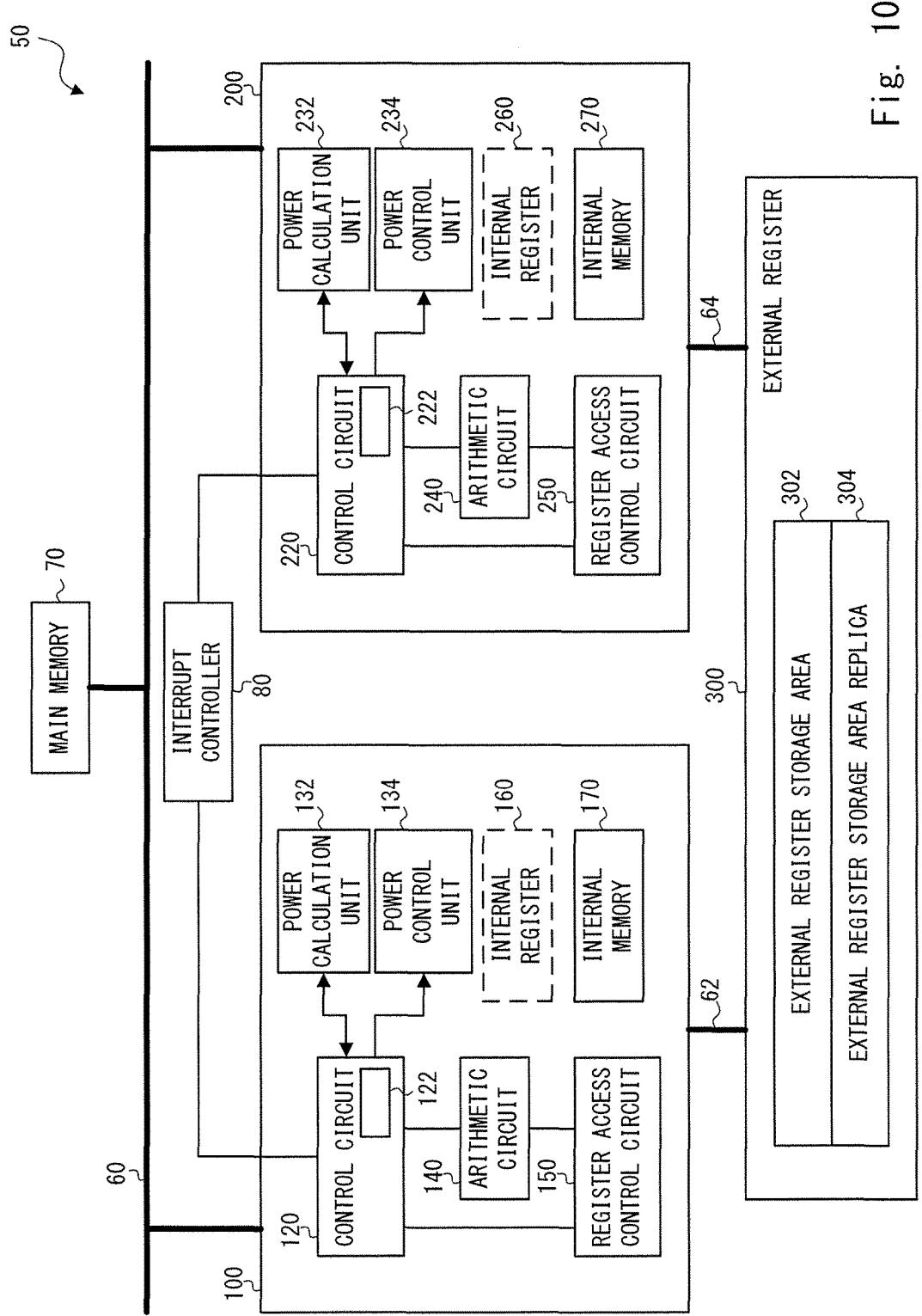
FIG. 10 shows a configuration of a semiconductor device according to a second embodiment.

FIG. 10 shows a configuration of a semiconductor device 50 according to a second embodiment. The second embodiment is different from the first embodiment in that the external register 300 includes an external register storage area 302, which is a first storage area, and an external register storage area replica 304, which is a second storage area and is a replica of the first storage area. The rest of the configuration is substantially the same as that of the first embodiment, and therefore its explanation is omitted. Note that the external register storage area 302 and the external register storage area replica 304 may be implemented as separate storage areas in one physical storage circuit, or may be implemented as mutually-separate storage circuits.

Examples of the external register storage area replica 304 include the following two cases. A first example of the external register storage area replica 304 is use as a register bank that is used to save data originally stored in the external register storage area 302 when an interruption occurs. Further, a second example of the external register storage area replica 304 is use as a replica of a register used in a virtual machine.

Firstly, the first example (register bank) is explained. The external register storage area 302 is used for ordinary arithmetic processing performed in the arithmetic circuit 140 in a manner similar to that in the above-described first embodiment. (This is also applied to the arithmetic circuit 240, and the following explanation is also applied to the arithmetic circuit 240.) That is, the arithmetic circuit 140 usually performs arithmetic processing by using the external register storage area 302. In contrast to this, the external register storage area replica 304 is used to save data originally stored in the external register storage area 302 when an interruption occurs while the arithmetic circuit 140 is performing certain arithmetic processing.

The first example is explained by using a specific example. For example, assume that the arithmetic circuit 140 is performing image processing by using the external register storage area 302. Assume also that an interruption for processing related to a camera (camera processing) occurs in this state. In this case, the control circuit 120 (or the arithmetic circuit 140) copies (saves) the operation data related to the image processing stored in the external register storage area 302 into the external register storage area replica 304. Then, the arithmetic circuit 140 performs the camera processing by using the external register storage area 302. Note that the execution state data stored in the internal storage circuit (i.e., data other than the operation data) can be saved into the respective register bank corresponding to the internal storage circuit.

Then, when the camera processing is finished, the control circuit 120 (or the arithmetic circuit 140) returns the operation data related to the image processing saved in the external register storage area replica 304 to the external register storage area 302. Then, the arithmetic circuit 140 resumes the image processing by using the operation data related to the image processing returned to the external register storage area 302. Alternatively, the arithmetic circuit 140 may resume the image processing by using the operation data stored (saved) in the external register storage area replica 304 instead of returning the operation data to the external register storage area 302.

Next, the second example (virtual machine) is explained. In this case, each of the high-performance processor 100 and the low-performance processor 200 can implement a plurality of virtual machines. Therefore, in this embodiment, assume that one external register storage area replica 304 is provided for each of the plurality of virtual machines. For example, when the number of virtual machines is one, only the external register storage area 302 is provided. However, when the number of virtual machines is two, one external register storage area replica 304 in addition to the external register storage area 302 is provided. Similarly, when the number of virtual machines is three, two external register storage area replicas 304 in addition to the external register storage area 302 may be provided. In this way, each virtual machine performs arithmetic processing that should be performed by the arithmetic circuit 140 by using the external register storage area 302 and the external register storage area replica 304.

In the case in which registers for the arithmetic circuits 140 and 240 are provided in their respective high-performance processor 100 and the low-performance processor 200, when the above-described replicas of the registers are necessary, the circuit area (i.e., the circuit size) of each of the high-performance processor 100 and the low-performance processor 200 needs to be increased. In such a case, the overall circuit area of the system increases. In contrast to this, in the second embodiment, since the high-performance processor 100 and the low-performance processor 200 share the external register 300, only the circuit area (i.e., the circuit size) of the shared external register 300 needs to be increased even when the replicas of the registers are necessary. Therefore, the increase in the overall circuit area of the system can be reduced.

Third Embodiment

Next, a third embodiment is explained.

Figure 11:
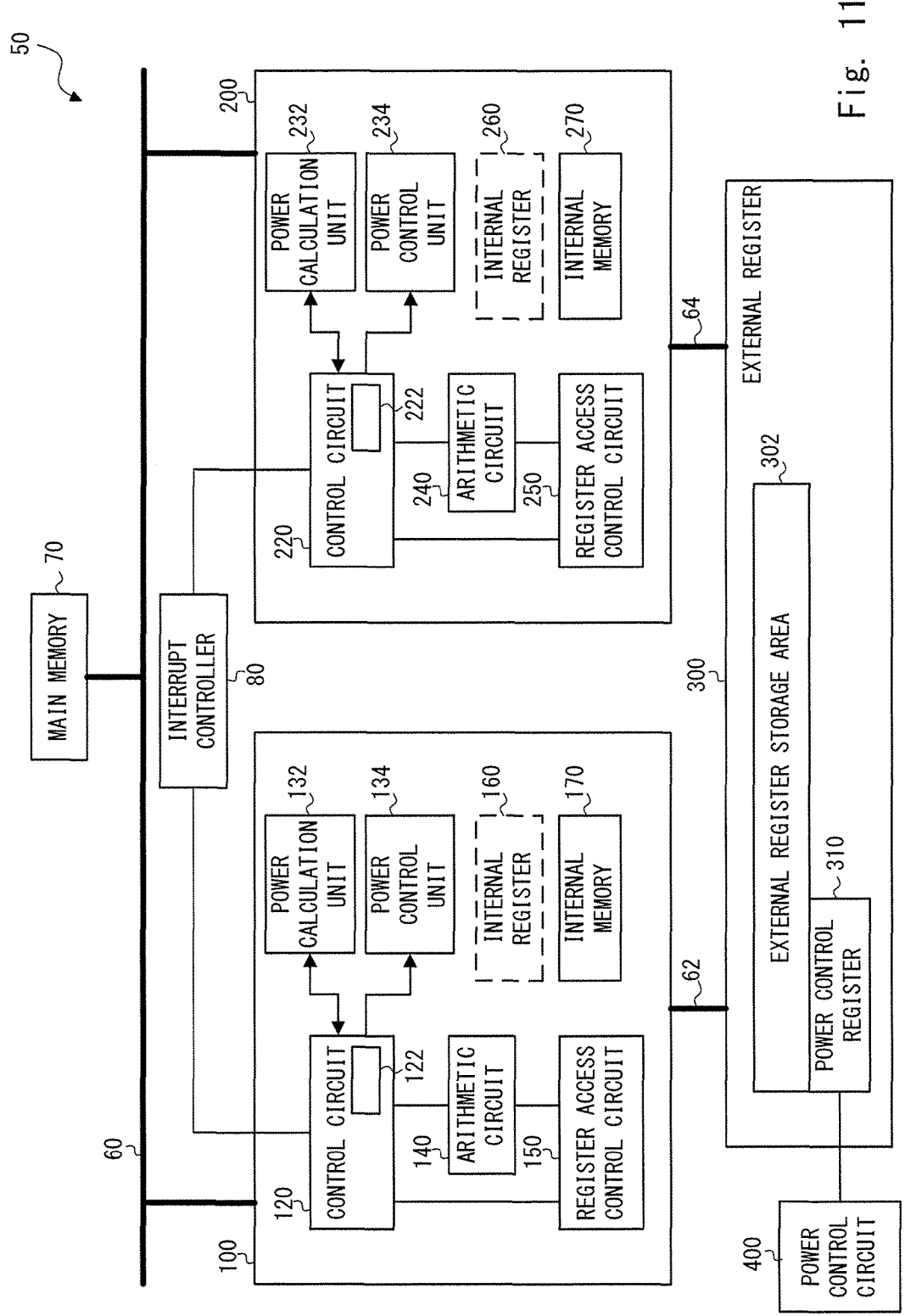
FIG. 11 shows a configuration of a semiconductor device according to a third embodiment.

FIG. 11 shows a configuration of a semiconductor device 50 according to a third embodiment. The third embodiment is different from the first embodiment in that a configuration for controlling the power is provided for the external register 300 independently of the high-performance processor 100 and the low-performance processor 200. The rest of the configuration is substantially the same as that of the first embodiment, and therefore its explanation is omitted.

The external register 300 includes an external register storage area 302 and a power control register 310. Further, the semiconductor device 50 also includes a power control circuit 400 that controls the power of the external register 300. The power control register 310 stores information for controlling the power of the external register 300. For example, the power control register 310 stores information indicating a power state that should be controlled (external register power state information). Note that the external register power state information indicates the power state of the external register 300 that should be controlled and indicates that, for example, "the power state should be controlled (or adjusted) to a 50% power state".

When the high-performance processor 100 is in operation, the control circuit 120 stores this external register power state. That is, the control circuit 120 issues an instruction for controlling the power of the external register 300. In this state, the control circuit 120 stores the external register power state information into the power control register 310 according to the use state (the load state) of the external register 300. For example, when the external register 300 is not used at all, the control circuit 120 may store external register power state information indicating that, for example, "the power state should be controlled to a 0% power state".

The power control circuit 400 controls the power of the external register 300 according to the external register power state information stored in the power control register 310. For example, when the external register power state information indicates that "the power state should be controlled to a 50% power state", the power control circuit 400 controls the power of the external register 300 so that its power state becomes the 50% power state. Further, for example, when the external register power state information indicates that "the power state should be controlled to a 0% power state", the power control circuit 400 may cut off the power to the external register 300.

In the case in which the power of the external register 300 is not controlled separately from the power of the high-performance processor 100 and the low-performance processor 200, there is a possibility that the power of the external register 300 depends on one of the high-performance processor 100 and the low-performance processor 200 that is in operation. It should be noted that there is a possibility that each processor (i.e., each of the high-performance processor 100 and the low-performance processor 200) temporarily maximizes the frequency of all the resources (including the external register 300) controlled by that processor when the processor is started up. In such a case, for example, when the low-performance processor 200 is started up, the external register 300 is brought into a high-power state as the low-performance processor 200 becomes the high-power state. Therefore, the amount of power consumed by the external register 300 increases. If the use state of the external register 300 is low in this state, the external register 300 consumes wasteful power.

In contrast to this, the third embodiment is configured so that the power of the external register 300 is controlled separately from both of the processors. That is, the power control register 310 and the power control circuit 400 are provided in the third embodiment. Therefore, in the third embodiment, the power of the external register 300 can be controlled independently of the power states of both processors. Further, in the third embodiment, the power of the external register 300 can be controlled by using the external register power state information stored in the power control register 310. Therefore, the power of the external register 300 can be controlled according to the use state of the external register 300.

Modified Examples

Note that the present invention is not limited to the above-described embodiments, and they can be modified as desired without departing from the spirit and scope of the present invention. For example, the above-described embodiments may be modified as explained below.

Figure 12:
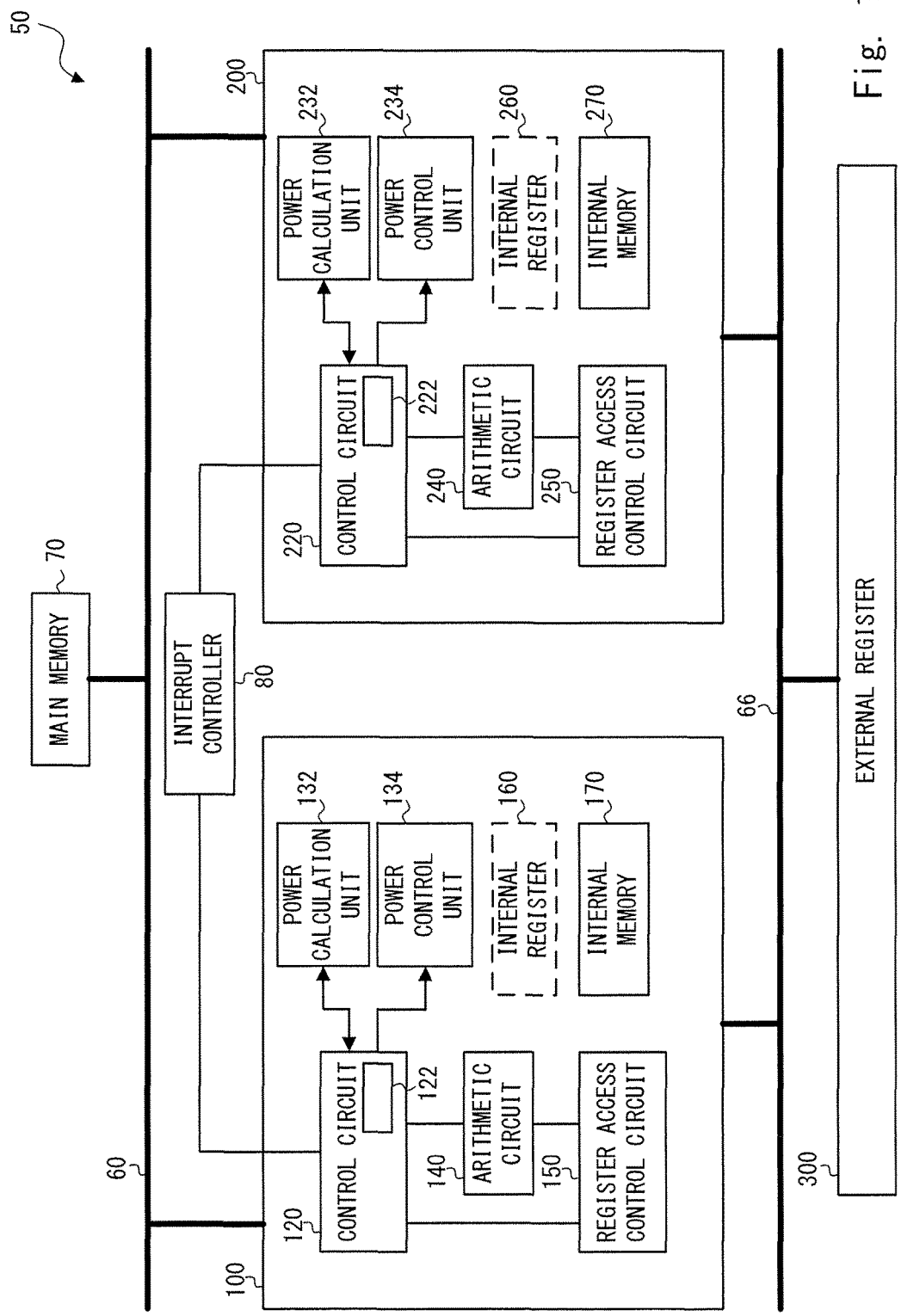
FIG. 12 shows a semiconductor device according to a modified example.

FIG. 12 shows a semiconductor device 50 according to a modified example. In the above-described embodiments, the external register 300 is connected to the high-performance processor 100 through the bus 62 and connected to the low-performance processor 200 through the bus 64. That is, in the above-described embodiments, the external register 300 is connected to the high-performance processor 100 and the low-performance processor 200 through mutually-different busses. However, as shown in the semiconductor device 50 according to the modified example, the external register 300 may be connected to the high-performance processor 100 and the low-performance processor 200 through a common bus 66.

Note that since the external register 300 is connected to the high-performance processor 100 and the low-performance processor 200 through the common bus 66, the speed at which the arithmetic circuits 140 and 240 access the external register 300 decreases. In other words, by connecting the external register 300 to the high-performance processor 100 and the low-performance processor 200 through the mutually-different busses 62 and 64 as in the case of the above-described embodiments, the speed at which the arithmetic circuits 140 and 240 access the external register 300 increases. Therefore, the operation speed (or the calculation speed) of the arithmetic circuits 140 and 240 can be increased.

Further, although the second and third embodiments are separately explained in the above explanation, the present invention is not limited to such configurations. The third embodiment may be applied to (i.e., combined with) the second embodiment. That is, the external register 300 may include the power control register 310 in addition to the external register storage area replica(s) 304.

Further, in the above-described embodiments, examples where the migration stimulus, which triggers the migration of the program executing entity, is a decrease or an increase in the power value are explained. However, the migration stimulus is not limited to the decrease or the increase in the power value. For example, the migration stimulus may be a decrease or an increase in the temperature of the processor in operation.

Further, nothing is mentioned about the physical positional relation among the high-performance processor 100, the low-performance processor 200, and the external register 300 in the above-described embodiments. However, the external register 300 may be physically located near the high-performance processor 100. In this case, for example, the bus 62 between the high-performance processor 100 and the external register 300 may be a dedicated bus having a relatively short length and the bus 64 between the low-performance processor 200 and the external register 300 may be a common bus. With this configuration, the speed at which the arithmetic circuit 140 in the high-performance processor 100 accesses the external register 300 increases, thus making it possible to increase the operation speed of the arithmetic circuit 140 of the high-performance processor 100.

Further, in the above-described embodiments, the arithmetic circuits 140 and 240 are the circuits that perform operations related to the program. However, the present invention is not limited to such a configuration. The control circuits 120 and 220 may perform operations. However, since the arithmetic circuits 140 and 240 can perform arithmetic processing at a higher speed than the control circuits 120 and 220, the control circuits 120 and 220 may perform only very simple operations.

Further, in the above-described embodiments, examples where the "first processor" and the "second processor" correspond to the "high-performance processor 100" and the "low-performance processor 200", respectively, are explained. However, the present invention is not limited to such a configuration. That is, the "first processor" and the "second processor" may correspond to the "low-performance processor 200" and the "high-performance processor 100", respectively. This is similarly applied to the "first control circuit" and the "second control circuit", the "first arithmetic circuit" and the "second arithmetic circuit", and the "first internal storage circuit" and the "second internal storage circuit".

The present invention made by the inventors has been explained above in a specific manner based on embodiments. However, the present invention is not limited to the above-described embodiments, and needless to say, various modifications can be made without departing from the spirit and scope of the present invention.

The whole or part of the embodiments disclosed above can be described as, but not limited to, the following supplementary notes.

(Supplementary Note 1)

A semiconductor device comprising:
a plurality of processors, each of the plurality of processors being configured to execute a program; and
an external register disposed outside the processors, the external register being connected to each of the plurality of processors, wherein
each of the plurality of processors comprises:
a control circuit that controls execution of the program;
an arithmetic circuit that performs an operation related to the program by using the external register; and
at least one internal storage circuit, the at least one internal storage circuit being disposed inside of a respective one of the plurality of processors,
the external register stores operation data related to the operation performed in the arithmetic circuit, and
the internal storage circuit stores execution state data regarding a state of the execution of the program, the execution state data being data that is transferred from a first processor to a second processor when the second processor takes over the execution of the program from the first processor halfway through the execution of the program, the first and second processors being processors among the plurality of processors.

The first, second and third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
a plurality of processors, each of the plurality of processors being configured to execute a program; and
an external register disposed outside the processors, the external register being connected to each of the plurality of processors, wherein
each of the plurality of processors comprises:
a control circuit that controls execution of the program;
an arithmetic circuit that performs an operation related to the program by using the external register; and
at least one internal storage circuit, the at least one internal storage circuit being disposed inside of a respective one of the plurality of processors,
the internal storage circuit stores execution state data regarding a state of the execution of the program, the execution state data being data that is transferred from a transfer-origin processor to a transfer-destination processor when a program executing entity is changed from one of the plurality of processors to another of the plurality of processors halfway through the execution of the program,
before the program executing entity is changed from the one of the plurality of processors to the another of the plurality of processors, the external register stores operation data related to the operation performed in the arithmetic circuit of the one of the plurality of processors, and
after the program executing entity is changed from the one of the plurality of processors to the another of the plurality of processors, the arithmetic circuit of the another of the plurality of processors performs the operation by using the operation data stored in the external register and the external register stores operation data related to the operation performed in the arithmetic circuit of the another of the plurality of processors.

2. The semiconductor device according to claim 1, wherein the control circuit controls the execution of the program by using the execution state data stored in the at least one internal storage circuit.

3. The semiconductor device according to claim 2, wherein
after the program executing entity is changed,
the control circuit of the transfer-destination processor controls the execution of the program by using the execution state data transferred from the transfer-origin processor.

4. The semiconductor device according to claim 1, wherein the external register is formed by a plurality of register circuits, or one circuit including a plurality of storage areas.

5. The semiconductor device according to claim 1, wherein the plurality of processors includes:
a first processor; and
a second processor having processing performance lower than that of the first processor and power efficiency higher than that of the first processor.

6. The semiconductor device according to claim 1, wherein the external register includes a first storage area and at least one second storage area, the second storage area being a replica of the first storage area.

7. The semiconductor device according to claim 1, wherein
the external register comprises a power control register for storing information for controlling power of the external register, and the semiconductor device further comprises a power control circuit that controls the power of the external register by using the information stored in the power control register.

8. The semiconductor device according to claim 7, wherein the power control circuit controls the power of the external register according to a use state of the external register.

9. The semiconductor device according to claim 1, further comprising a main memory connected to each of the plurality of processors through a bus, the main memory being configured to store at least the program.

10. The semiconductor device according to claim 1, wherein the external register is connected to each of the plurality of processors through mutually-different busses.

11. A control method for a semiconductor device, wherein when a first processor among a plurality of processors is executing a program, a first arithmetic circuit provided in the first processor performs an operation related to the program by using an external register provided outside the plurality of processors, the external register being configured to store operation data related to the operation performed in the first arithmetic circuit, and when a program executing entity is changed from the first processor to a second processor among the plurality of processors, execution state data related to an execution state of the program is transferred to the second processor, the execution state data being data stored in a first internal storage circuit provided inside the first processor, wherein after the program executing entity is changed from the first processor to the second processor, a second arithmetic circuit provided in the second processor performs an operation by using the operation data stored in the external register and the external register stores operation data related to the operation performed in the second arithmetic circuit provided in the second processor.

12. The control method for a semiconductor device according to claim 11, wherein when the first processor is executing the program, a first control circuit provided in the first processor controls execution of the program by using the execution state data stored in the first internal storage circuit.

13. The control method for a semiconductor device according to claim 12, wherein after the program executing entity is changed from the first processor to the second processor, a second control circuit provided in the second processor controls the execution of the program by using the execution state data transferred from the first internal storage circuit.

* * * * *